(12) United States Patent
Wright

(10) Patent No.: US 7,320,350 B2
(45) Date of Patent: Jan. 22, 2008

(54) SIDEWALL REINFORCING LAYER FOR PNEUMATIC TIRES

(75) Inventor: Richard J. Wright, Wadsworth, OH (US)

(73) Assignee: Bridgestone Firestone North American Tire, LLC, Nashville, TN (US)

( * ) Notice: Subject to any disclaimer, the term of this patent is extended or adjusted under 35 U.S.C. 154(b) by 0 days.

(21) Appl. No.: 11/177,579

(22) Filed: Jul. 8, 2005

(65) Prior Publication Data

US 2007/0006958 A1    Jan. 11, 2007

(51) Int. Cl.
*B60C 15/00* (2006.01)
*B60C 9/00* (2006.01)

(52) U.S. Cl. .................. 152/539; 152/543; 152/555

(58) Field of Classification Search ........... 152/539, 152/541, 542, 543, 546, 555
See application file for complete search history.

(56) References Cited

U.S. PATENT DOCUMENTS

| | | | |
|---|---|---|---|
| 3,509,930 A * | 5/1970 | Mirtain .................. | 152/555 |
| 4,047,551 A | 9/1977 | Mezzanotte | |
| 4,111,249 A | 9/1978 | Markow | |
| 4,257,469 A * | 3/1981 | Uemura .................. | 152/554 |
| 4,934,431 A * | 6/1990 | Agari et al. ............. | 152/543 |
| 5,048,584 A * | 9/1991 | Nakano et al. .......... | 152/543 |
| 5,058,649 A * | 10/1991 | Hoang et al. ........... | 152/540 |
| 5,392,830 A | 2/1995 | Janello et al. | |
| 5,631,820 A | 5/1997 | Donnelly et al. | |
| 5,779,829 A | 7/1998 | Prakash et al. | |
| 5,894,875 A * | 4/1999 | Masaki et al. .......... | 152/527 |
| 6,634,397 B1 | 10/2003 | Oare et al. | |
| 6,834,694 B2 | 12/2004 | Muhlhoff | |
| 2001/0010245 A1 | 8/2001 | Kanenari et al. | |
| 2002/0112798 A1 | 8/2002 | Larsen | |
| 2003/0136488 A1 | 7/2003 | Muhlhoff | |

FOREIGN PATENT DOCUMENTS

| | | | |
|---|---|---|---|
| JP | 09024703 | * | 1/1997 |
| JP | 2000062416 | * | 2/2000 |

OTHER PUBLICATIONS

Machine trabslation of JP 09024703.*
Machine translation of JP 2000062416.*

* cited by examiner

*Primary Examiner*—Justin R. Fischer
(74) *Attorney, Agent, or Firm*—Thomas R. Kingsbury

(57) ABSTRACT

A pneumatic tire may include a floating reinforcing layer disposed between a body ply and the sidewall of the tire. The reinforcing layer may extend from a point beneath the rim flange of the wheel to a point just above or below the maximum section width of the tire. By adding stiffness to the sidewall region at and above the rim, the reinforcing layer enhances the durability of tire without sacrificing ride comfort.

20 Claims, 5 Drawing Sheets

SIDEWALL REINFORCING LAYER FOR PNEUMATIC TIRES

BACKGROUND

Exemplary embodiments of the present invention pertain to pneumatic tires. In particular, exemplary embodiments of the present invention pertain to reinforcing layers for the sidewalls of pneumatic tires.

Pneumatic tires may be constructed from a radial body ("carcass") ply, which is attached to a bead structure, to form a toroidal shape when inflated. The bead structure may include a plurality of steel wires or cables, which, under tension, fit around the rim flange of a wheel for a vehicle. The radial body ply may be wrapped circumferentially with at least one steel belt. The tread, which contacts the road surface, may be formed outside of the at least one steel belt. The tread may be connected to the bead structure by a section of sidewall rubber.

SUMMARY

A tire design is described that may include a pair of annular beads, a radial carcass ply extending between the beads, a tread disposed circumferentially around the carcass ply, a sidewall extending from the tread to the beads, and a reinforcing layer disposed between the carcass ply and the sidewall. In one exemplary embodiment, the reinforcing layer may extend from a lower edge positioned approximately adjacent to, or within one bead height of a highest extent of the bead. Positioned thusly, the reinforcing layer may be located beneath the rim flange of the wheel when installed, providing additional stiffness to the sidewall in the area which may otherwise suffer maximum deflection when the tire is inflated and the vehicle is loaded.

In another exemplary embodiment, the reinforcing layer extends from beneath the rim flange to a position less than about 60% of the section height of the tire. By limiting the reinforcing layer to areas below 60% of the section height, the region near the shoulder of the tire may not be stiffened appreciably, so that the smoothness of the ride may not be compromised by stiffening the sidewall in the region near the rim flange.

The reinforcing layer may include cords that are preferably disposed at an angle between 40 and 50 degrees with respect to the cords of the radial carcass plies, with a more preferred angle of 45 degrees. Using this configuration, the cords may distribute the load across a plurality of cords in the radial carcass plies, enhancing the strength and stiffness of the sidewall.

These and other features and advantages are described in, or are apparent from, the following detailed description of various exemplary embodiments.

BRIEF DESCRIPTION OF THE DRAWINGS

Various exemplary embodiments will be described in detail, with reference to the following figures, wherein.

DETAILED DESCRIPTION

Figure 1:
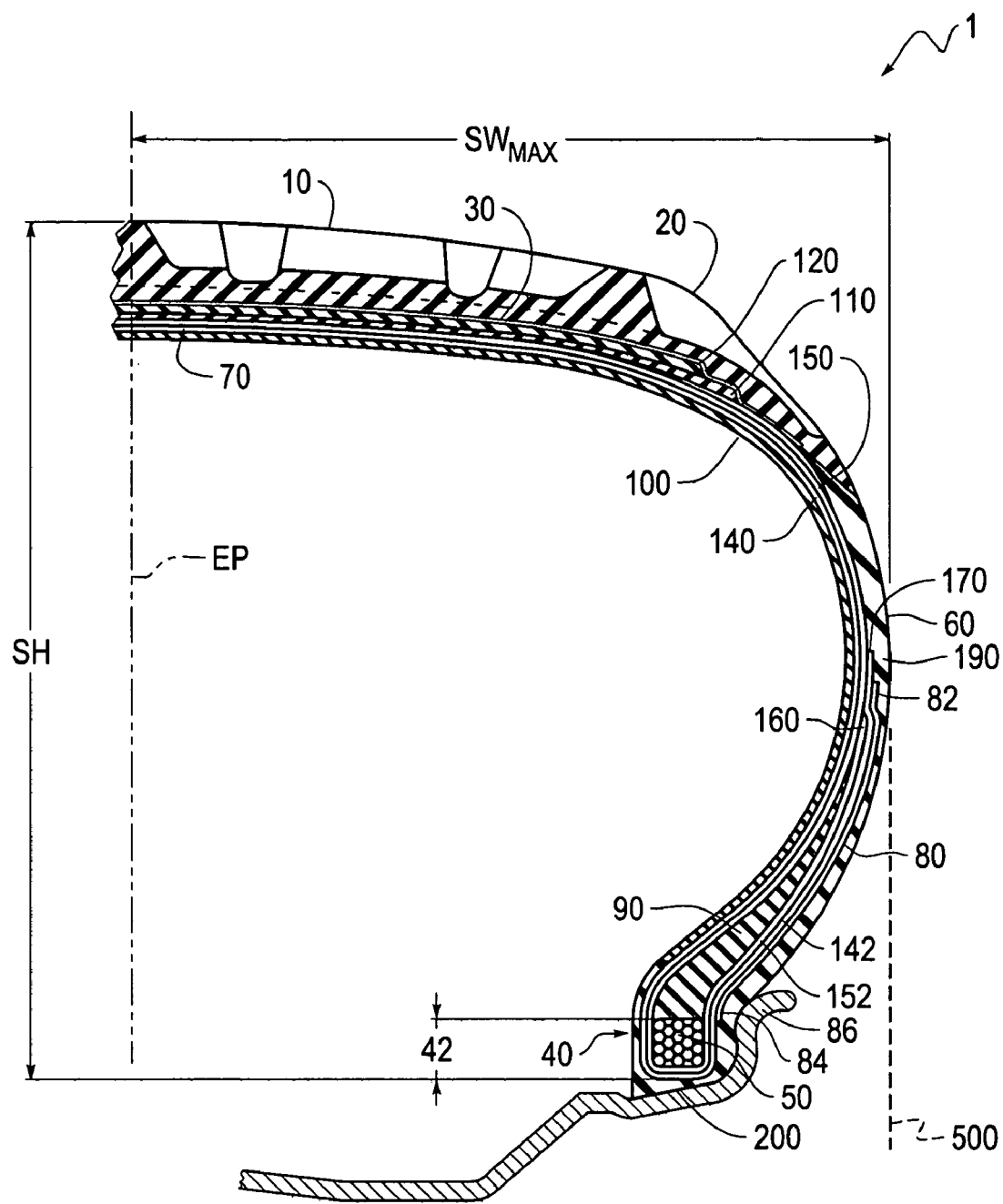
FIG. 1 is a schematic sectional view of a pneumatic tire in accordance with an exemplary embodiment.

Exemplary embodiments according to the present invention are described below with reference to the above drawings, in which like reference numerals designate like components. In addition, the following terms used herein are defined as set forth below:

"Axial" and "axially" refer to lines or directions that are parallel to the axis of rotation of the tire.

"Bead" is an annular tensile member typically attached to or wrapped by ply cords and shaped to fit a rim flange.

"Belt structure" or "Reinforcing Belts" is at least one annular layer or ply of parallel cords, underlying the tread, unanchored to the bead, whose cords generally form an angle of between 18° and 30° with respect to the equatorial plane of the tire.

"Carcass" is the tire structure apart from the belt structure, tread, and sidewall rubber over the plies, but including the beads.

"Chafer" is the area between the bead and the sidewall of a tire.

"Circumferential" refers to lines or directions extending along the perimeter of the surface of the annular tread perpendicular to the axial direction.

"Cord" is one of the reinforcement strands of which the plies in the tire are comprised.

"Rim flange" is the metal member attached to the vehicle axle on which the tire is mounted, having a specified configuration and width.

"Rim flange width" is the axial distance between rim flange flanges.

"Equatorial plane (EP)" is the plane perpendicular to the tire's axis of rotation and passing through the center of its tread.

"Hysteresis" describes energy that is converted to heat through molecular interaction and is not dissipated.

"Inner liner" is the layer or layers of elastomer or other material that form the inside surface of a tubeless tire and that contain the inflating fluid within the tire.

"Modulus" describes the measure of the hardness or stiffness of a material.

"Normal inflation pressure" refers to the specific design inflation pressure assigned by the appropriate standards organization for the service condition for the tire.

"Normal load" refers to the specific design inflation load assigned by the appropriate standards organization for the service condition for the tire.

"Ply" is a continuous layer of rubber-coated parallel cords which forms a unit of a tire carcass. The plies are made of cord, fiberglass, steel, or structural fabric.

"Radial" and "radially" refer to directions toward or away from the axis of rotation of the tire.

"Radial-ply tire" means a belted or circumferentially-restricted pneumatic tire in which the ply cords which extend from bead to bead are laid at cord angles between 65° and 95° with respect to the equatorial plane of the tire.

"Section height" (SH) means the radial distance from the nominal rim flange diameter to the outer diameter of the tire at its equatorial plane.

"Section width" (SW) means the linear distance parallel to the axis of the tire and between the exterior of its sidewalls when and after it has been inflated at normal pressure for 24 hours, but unloaded. The "Maximum section width" ($SW_{max}$) is the maximum such linear distance.

"Shoulder" means the upper portion of a sidewall just below the tread edge.

"Sidewall" means that portion of a tire between the tread and the bead.

"Tread width" means the arc length of the tread surface in the axial direction, that is, in a plane passing through the axis of rotation of the tire.

Because the tire sidewalls are relatively thin compared to, for example, the tread, a number of patents disclose tire structures which use one or more reinforcing layers to provide the sidewall with added strength in particular areas. For example, U.S. Patent Application Publication No. 2002/0112798 A1 (the '798 publication), hereby incorporated by reference in its entirety, discloses a pneumatic radial ply tire, wherein each sidewall has a gumstrip interposed between two radial carcass plies, and extending from below the belt structure to a location at or above the maximum section width of the tire. The gumstrip provides the tire with enhanced steering responsiveness and cornering performance, especially for relatively high aspect ratio tires.

U.S. Pat. No. 5,392,830 (the '830 patent), hereby incorporated by reference in its entirety, discloses another reinforcing layer design, in which the reinforcing layer is disposed outside of the radial plies and inside the tire sidewall. The reinforcing layer in the '830 patent extends from a location at a predefined distance from the steel belts, downward toward the bead structures of the tires. The lower portion of the reinforcing layer is disposed about halfway between a first turned up portion of the radial ply, and a second turned up portion of a second radial ply. The purpose of the reinforcement layer is to provide impact protection by preventing punctures to the sidewalls, from objects on the road surface. Thus, the reinforcing layer is located primarily at the shoulder of the sidewall, and does not extend beneath the rim flange of the wheel.

Increasing the thickness of the sidewall material may make the vehicle more responsive to steering. However, the additional rigidity may cause the tire to transmit road vibration more effectively to the vehicle occupants. Also, decreasing the thickness of the sidewall material generally makes the tire more compliant and enhances ride smoothness, however, decreasing the thickness of the sidewall material may also make the vehicle less responsive to steering. Therefore, approaches, such as those described in the '798 publication and the '830 patent, which add material to the sidewall in the shoulder region of the tire, typically result in a stiffer sidewall which degrades the smoothness of the ride.

Furthermore, the approaches described above do not increase the sidewall strength in the area most susceptible to flexing and heating at high speeds, which is the area nearest the rim flange of the wheel.

Exemplary embodiments of the present tire construction may provide a reinforcing layer which may be disposed from beneath the rim flange of the wheel to a point at or near the maximum section width of the tire. This design may therefore add additional strength and rigidity to the tire in a region susceptible to deflection and wear, without stiffening the ride characteristics of the tire.

FIG. 1 is a schematic sectional view of a pneumatic tire in accordance with a first exemplary embodiment. As shown in FIG. 1, an exemplary pneumatic tire 1 may include a tread portion 10 having a lateral edge 20, a bead portion 40, a carcass structure 70, and a sidewall 60. The bead portion 40 may include a bead core 50 and bead filler 90.

The carcass structure 70 may include at least one radial carcass ply. For example, the carcass structure may include an inner ply 140 and an outer ply 150, each extending between the bead cores 50, and adjacent the sidewall portions and the tread portion. The inner and outer plies 140, 150 may turn-up around the bead core 50 to form turned-up portions 142, 152. The carcass plies 140, 150 may each include organic fiber cords, such as polyester cords or rayon cords, for example, and may be arranged at an angle in a 10° range of 85° to 95° (+85° to −85°) with respect to an equatorial plane EP of the tire.

Although the embodiment depicted in FIG. 1 shows a two-ply carcass structure, it should be understood that this structure is exemplary only, and that the floating reinforcing layers described herein may be applied to tires having a single-ply carcass structure and may also be applied to tires having a carcass structure with more than two plies.

The tread portion 10 may have a tread width over which the tire contacts the road, and may be reinforced with a belt package 30. The belt package 30 may include only one belt. Alternatively, the belt package 30 may include two or more belts. In an exemplary embodiment, the belt package 30 may include two belts arranged symmetrically with respect to the equatorial plane EP of the tire, such that a lateral edge 110 of an inner belt may extend beyond a lateral edge 120 of an outer belt. Each belt may include inextensible cords, such as steel cords, for example. The steel cords in each belt may be inclined with respect to one another, such that the cords in one belt are crossed at an angle with those in an adjacent belt. The angle of the cords may be in a range of 18° to 30° with respect to the equatorial plane EP.

The bead filler 90 of the bead portion 40 may be arranged radially outwardly from the bead core 50 between the main bodies of the carcass plies 140, 150 and their turned-up portions 142, 152. The bead filler 90 may have a long, tapering, substantially triangular cross-sectional shape, as shown in FIG. 1.

A turned-up portion of at least one of the carcass plies may end above the upper end of the bead filler 90. In FIG. 1, both turned-up ends 160, 170 of the turned-up portions 142, 152 of the carcass plies 140, 150 may extend above the upper end of the bead filler 90, such that both carcass plies 140, 150 completely encompass the bead filler 90. This structure may provide enhanced durability. The turned-up end 160 of the outer ply 150 may end just below the maximum section width $SW_{max}$ point of the tire, and the turned-up portion 170 of the inner ply 140 can extend over the turned-up end 160 of the outer ply 150 to end above the maximum section width $SW_{max}$ point of the tire.

An inner liner 100 may cover an inner surface of the tire 1. The inner liner 100 may be made of any ordinary rubber or other material which is impenetrable to air, such as halogenated butyl rubber, for example.

The axial outer side of the sidewall 60 may be entirely covered with an outer cover rubber 190. The outer cover rubber 190 may be made of a material having excellent bending resistance.

The outer side of the bead portion 40 may be covered with a rubber chafer 200. The rubber chafer 200 may be made of a material having excellent wear resistance.

The sidewall 60 may be reinforced with a sidewall reinforcing layer 80 that may be disposed between the turned up end 170 of inner carcass ply 140 and the sidewall 60. Thus, the sidewall reinforcing layer 80 may be placed axially outward of the carcass structure 140, 150, 160 and 170. However, the invention is not limited to this disposition of the sidewall reinforcing layer 80. In other words, the invention is intended to cover any appropriate disposition of the sidewall reinforcing layer 80.

The sidewall reinforcing layer 80 may be floatingly provided so that it is not integrally attached to the radial body plies. This structure makes the building process less difficult in comparison with tires that use sidewall reinforcing layers that are placed in between an inner carcass ply and an inner liner, for example, or within the plies of the carcass structure as in the '798 publication, because the reinforcing layer 80 may simply be placed over the body plies 140, 150, 160, and 170 on the tire-building drum during the first stage building process, and then setting the beads.

In one exemplary embodiment, the top edge 82 of the sidewall reinforcing layer 80 may be disposed at or below the maximum section width $SW_{max}$ point of the tire, so that the sidewall reinforcing layer does not extend to the shoulder region of the sidewall. In one embodiment that uses a reinforcing layer 80 disposed in such a manner, the ride comfort of the tire is not degraded appreciably by the presence of the sidewall reinforcing layer. In general, the top edge 82 of the sidewall reinforcing layer 80 may be disposed at or below 60% of the section height of the tire without significantly degrading ride comfort.

However, the bottom edge 84 of the sidewall reinforcing layer 80 is positioned at a point adjacent to, or just above, the highest extent of the bead 50. Although the bottom edge 84 of the sidewall reinforcing layer 80 is shown in FIG. 1 as being directly adjacent to the highest extent of the bead 50, the bottom edge 84 of the sidewall reinforcing layer 80 may be placed anywhere within a distance of less than about one bead height 42 from the top edge of the bead. The bead height 42 is defined as illustrated in FIG. 1. This structure positions the bottom edge 84 at a location generally beneath the elevation of the rim flange 86, as shown in FIG. 1. The positioning of the sidewall reinforcing layer beneath the rim flange 86 in such a manner provides additional rigidity to the sidewall in the region where the deflection due to the inflation of the tire and the vehicle load is at a maximum. In general, the transition between the region of the tire which is constrained by the rim flange 86, to the compliant region of the elastic sidewall, causes relatively large stresses in the compliant sidewall material in this region. The presence of the reinforcing layer 80 in this region stiffens the sidewall and distributes the stress over a larger area. This feature also clearly distinguishes the sidewall reinforcing layer of this exemplary embodiment from those of the '798 publication and the '830 patent, because the reinforcing layer is not disclosed in either of these references as extending to beneath the rim flange of the wheel.

Figure 2:
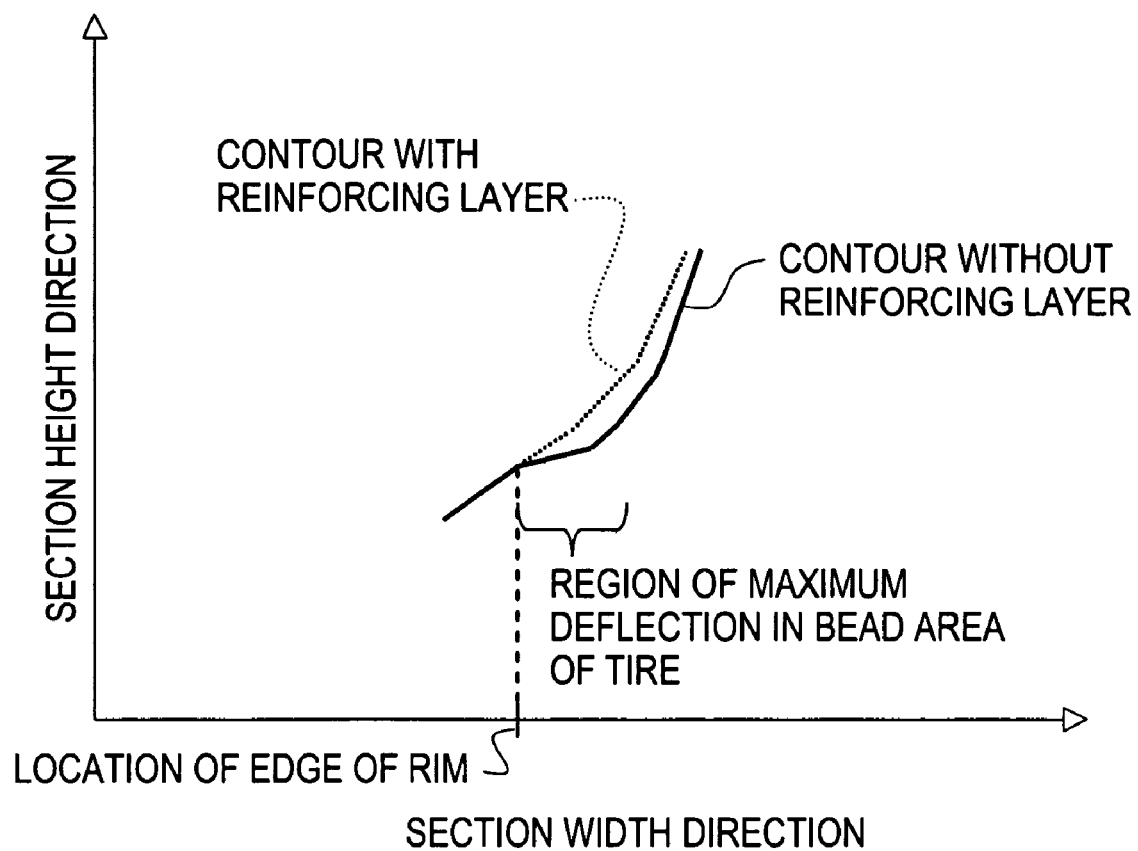
FIG. 2 is an illustration of the curvature of the outer contour of the bead area of a sidewall with and without the sidewall reinforcing layer.

FIG. 2 illustrates the curvature of the outer contour of the bead area of sidewall 60 with and without the sidewall reinforcing layer 80. As shown in FIG. 2, without the sidewall reinforcing layer 80, the sidewall 60 contour may curve out rather sharply beyond the point where the contour is supported by the rim flange 86. The curvature of the contour of the sidewall 60 beyond the rim flange 86, as depicted in FIG. 2, may not be to scale. However, the curvatures depicted in FIG. 2 demonstrate the relative effect of reinforcing layer 80 on this curvature. The bulge in the curvature (region of maximum deflection) may result from the inflation of the tire 1, as well as the loading of the vehicle. This cyclical deflection occurring during the rotation of the wheel, may cause a buildup of heat in this region, when the tire 1 is operated at high speeds. However, as also shown in FIG. 2, with the presence of the reinforcing layer 80, the bulge caused by the inflation of the tire 1 and the load of the vehicle may be reduced by distributing this stress over a wider area of the sidewall 60.

The reinforcing layer 80 may be made of any suitable elastic material which offers low hysteresis but high modulus. Such suitable materials may include, for example, nylon, rayon, aramid, Kevlar® and polyester, and combinations thereof. For example, one set of exemplary embodiments may include a reinforcing layer 80 with a thickness between about 0.5 mm to about 6 mm. Another set of exemplary embodiments may include a reinforcing layer 80 with a thickness between about 0.5 mm to about 3 mm. It should be appreciated that the thickness of the reinforcing layer 80 chosen may depend on the application. For example, for applications carrying heavy loads at high speeds, but where ride comfort is not of paramount importance, a relatively thick reinforcing layer 80 may be chosen. Such applications may include, for example, military transport vehicles, cargo trucks or tires for commercial airliners or other airplanes.

The total width of the reinforcing layer 80 along the sidewall may be determined based upon the section height (SH) of the tire 1 and the tire performance characteristics desired. As previously described, the reinforcing layer 80 preferably would not extend beyond about 60% of the section height for applications in which rider comfort is important. For other applications, the reinforcing layer 80 may extend up to, or near, the belt package 30. One exemplary embodiment of the floating reinforcing layer 80 has the lower end 84 extending 0.5" beneath the rim flange height, and the upper end 82 at 3.0" above the rim flange height.

The reinforcing layer 80 may include a plurality of parallel cords, which may be disposed at any angle (e.g., of about 40°- 50°, preferably 45°) with respect the radial cords of the carcass plies 140 and 150. In other words, the carcass ply has a plurality of parallel cords, extending from bead-to-bead in a plane perpendicular to the equatorial plane. For example, the cords in the reinforcing layer 80 may form an angle of + or −45° with respect to the direction of the cords in the radial carcass plies 140 and 150. By disposing the cords at an angle with respect to the cords of the radial carcass plies 140 and 150, the reinforcing layer can effectively resist the deformation of the radial carcass plies 140 and 150 under normal inflation and normal loads, as well as under high speed rotation conditions. For example, disposing the angle of the reinforcing layer 80 cords at angles of about 45° may help limit shear force deflection in the sidewall and increase the spring rate of the tire 1.

Although the reinforcing layer 80 is described herein as including a single layer 80, it should be understood that the reinforcing layer 80 may also include a plurality of reinforcing layers. These additional reinforcing layers may or may not exactly overlap, but rather, may be disposed in a staggered fashion, for example, in order to achieve various design goals. For example, the multiple layers may strengthen certain regions preferentially, while leaving other regions relatively compliant. In one exemplary embodiment, several reinforcing layers may be applied to the region of the tire in contact with and/or adjacent to rim flange 86, to strengthen the sidewall 60 in this region. The outer reinforcing layers of the plurality of reinforcing layers may terminate sooner, with respect to the section height of the tire 1, in order not to degrade the riding characteristics of the tire 1.

Similarly, although reinforcing layer 80 is shown in FIG. 1 as a single, uniformly thin layer, it should be understood that reinforcing layer 80 may have a shape chosen to serve any of a number of different purposes. For example, reinforcing layer 80 may be made thicker in the region near the rim flange 86, in order to provide greater support in this region, and thinner in the region approaching the maximum section width $SW_{max}$, to enhance ride comfort.

Furthermore, the single reinforcing layer 80 may in actuality be made from a plurality of different materials, for example, materials with higher stiffness near the rim flange 86 region, but with greater compliance near the maximum section width point $SW_{max}$.

Figure 3:
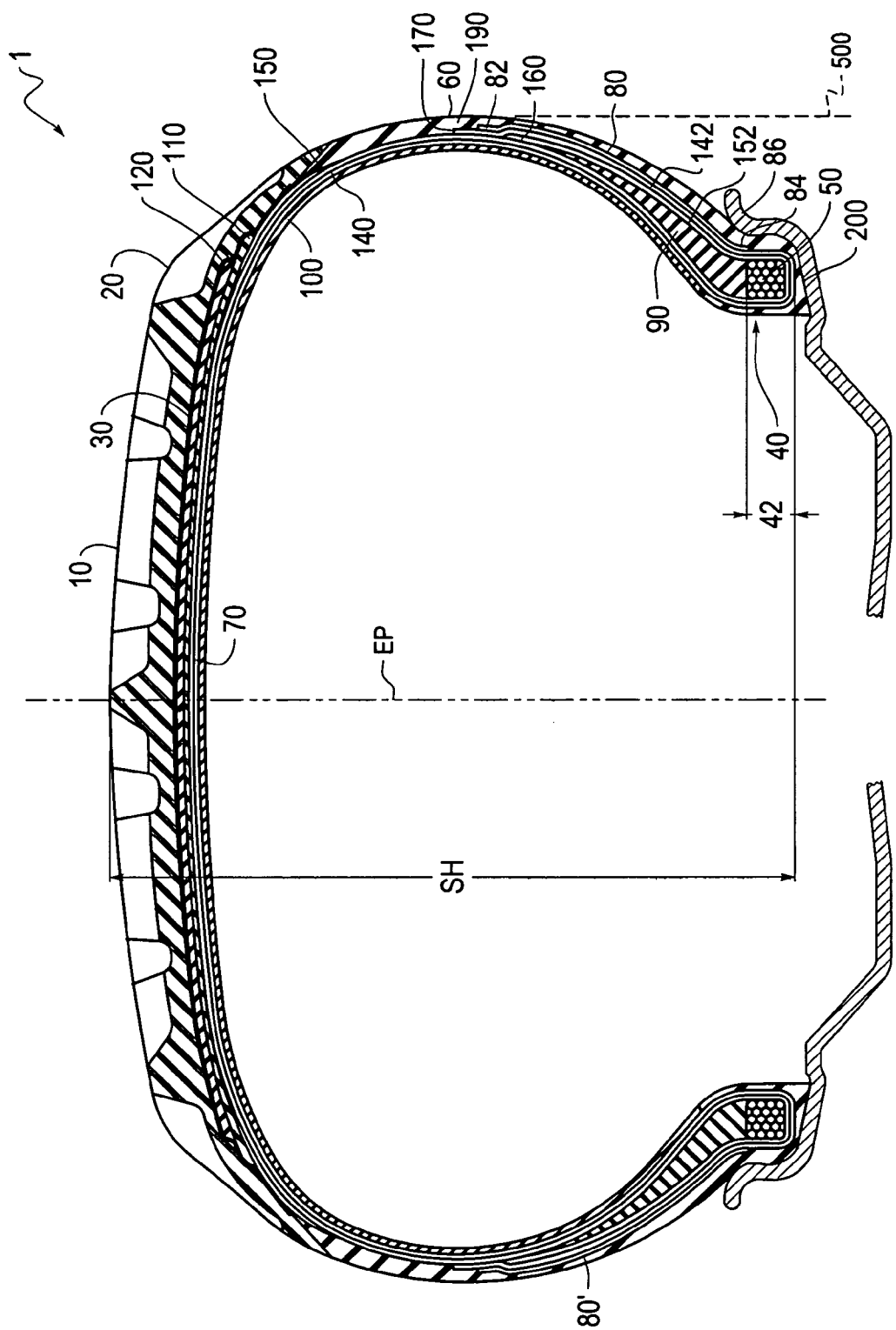
FIG. 3 is another schematic sectional view of the pneumatic tire of FIG. 1.

FIG. 3 is a schematic sectional view of the pneumatic tire 1 of FIG. 1. FIG. 3 is a more complete sectional view that shows both sides of the tire 1 including a pair of sidewall reinforcing layers 80 and 80'. Although FIG. 3 shows the sidewall reinforcing layers 80, 80' on each side of the tire as being identical, such is not necessarily the case. For example, in situations where the load is not applied in a direction normal to the surface of the tire, the sidewall reinforcing layer 80 may be made thicker on the side of the tire closer to the point of application of the load. Such situations may include, for example, subway systems wherein the tires may be deployed at an angle with respect to a vertical plane. Similarly, the second sidewall reinforcing layer 80' on the side of the tire furthest from the application of the load, may be entirely absent.

Figure 4:
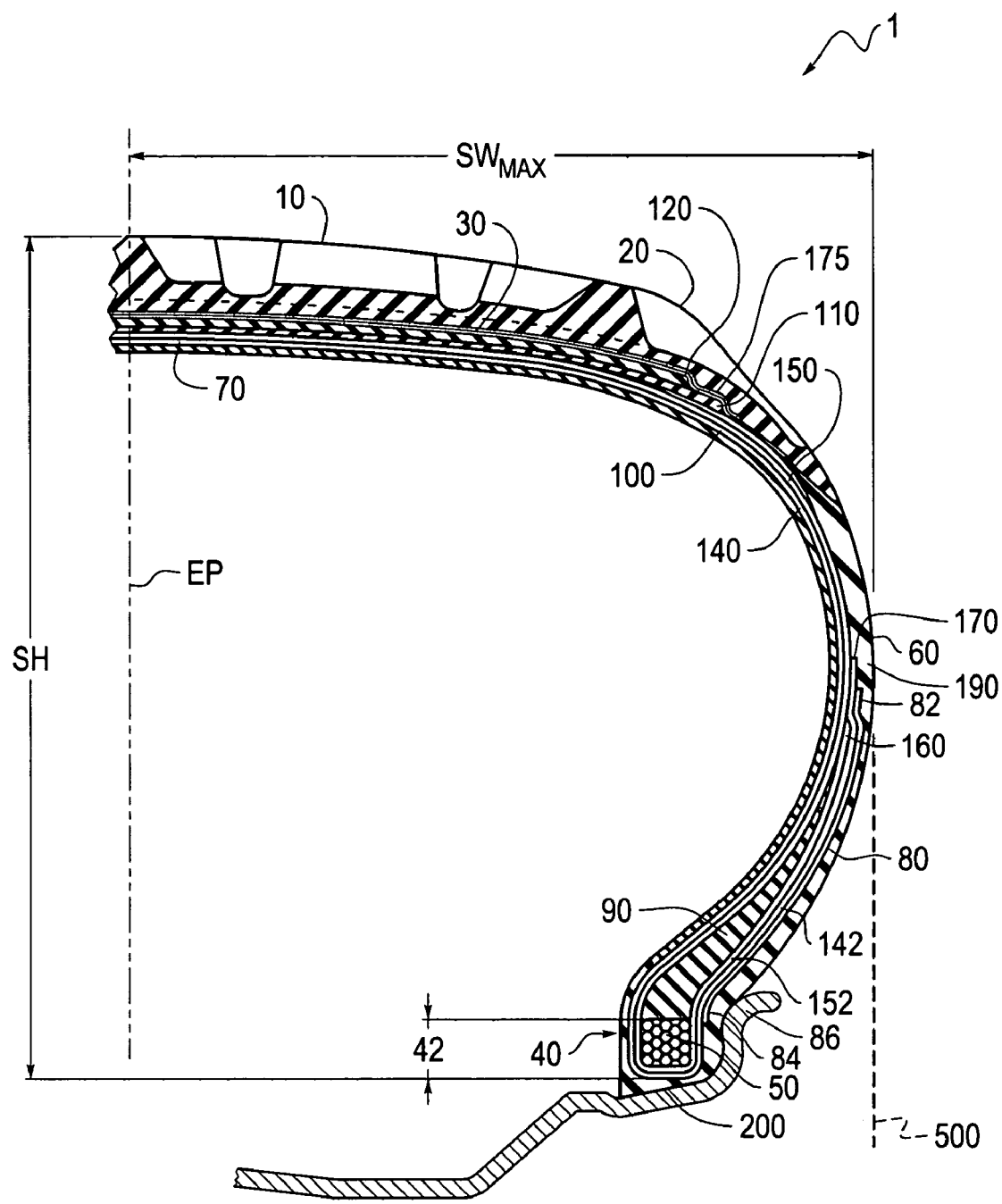
FIG. 4 is a schematic sectional view of a pneumatic tire in accordance with another exemplary embodiment of the invention that includes a cap ply.
Figure 5:
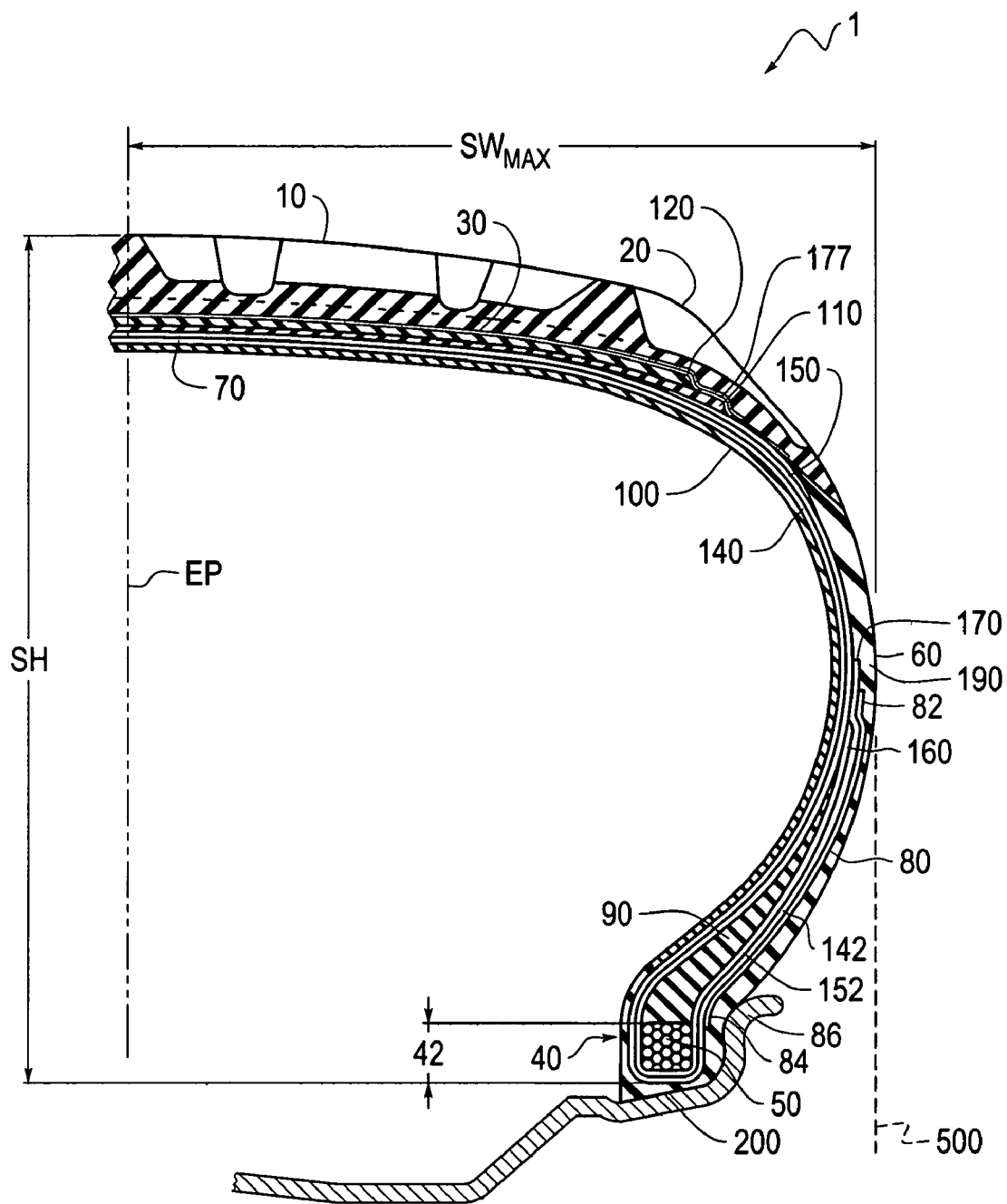
FIG. 5 is a schematic sectional view of a pneumatic tire in accordance with another exemplary embodiment of the invention that includes a cap strip.

The reinforcing layer 80 may also be combined with any of a number of additional tire features, such as those shown in FIGS. 4 and 5. For example, FIG. 4 shows the reinforcing layer 80 used in a tire that includes a fabric reinforced cap ply 175 skimmed with a thin layer of rubber, and disposed over steel belts 110 and 120.

FIG. 5 is a schematic sectional view of a pneumatic tire in accordance with another exemplary embodiment. The embodiment shown in FIG. 5 is similar to the embodiment shown in FIG. 4, except that it includes a fabric reinforcing cap strip 177 that may be used alone or in combination with the cap ply 175 shown in FIG. 4.

The exemplary embodiments of FIGS. 4 and 5 show that the exemplary sidewall reinforcing layer 80 can be used in other tire structures. In fact, the reinforcing layer 80 may be used in any related art, known or later developed tire structure.

While various details have been described in conjunction with the exemplary implementations outlined above, various alternatives, modifications, variations, improvements, and/or substantial equivalents, whether known or that are or may be presently unforeseen, may become apparent upon reviewing the foregoing disclosure. In particular, the tire designs disclosed herein may be applicable to any of a wide variety of tire applications in addition to passenger vehicles, including cargo trucks, airplanes, subway trains using compliant tires, and military transport vehicles. The designs described herein may be applicable to any system which uses a compliant member on a rotational rigid axle to support a load. Accordingly, the exemplary implementations set forth above, are intended to be illustrative, not limiting.

What is claimed is:

1. A pneumatic tire, comprising:
   a pair of annular beads defining a bead height;
   a radial carcass ply extending between the beads;
   a tread disposed circumferentially around the carcass ply, a center line of the tread defining an equatorial plane of the tire;
   a pair of sidewalls extending from the tread to the beads; and
   a first sidewall reinforcing layer, including one or more adjacent corded layers disposed between the carcass ply and a first sidewall of the pair of sidewalls, each of the one or more adjacent corded layers extending from a lower edge positioned axially outward of the radial carcass within one bead height of a highest extent of one annular bead of the pair of annular beads and at least one of the one or more adjacent corded layers extending to a top edge of the first sidewall reinforcing layer located at or above, in a radial direction, a point of maximum section width of the tire,
   wherein the first sidewall reinforcing layer has a different thickness at the lower edge than at a top edge.

2. The pneumatic tire of claim 1, wherein the lower edge of the first sidewall reinforcing layer is positioned approximately adjacent to the highest extent of the one bead.

3. The pneumatic tire of claim 1, the pneumatic tire being usable with a design rim, wherein the first sidewall reinforcing layer extends from a point below a contact point of the pneumatic tire with the design rim.

4. The pneumatic tire of claim 1, wherein the radial carcass ply comprises a plurality of cords disposed substantially perpendicularly with respect to the equatonal plane.

5. The pneumatic tire of claim 1, wherein the first sidewall reinforcing layer comprises at least one of nylon, aramid, rayon, and polyester.

6. The pneumatic tire of claim 4, wherein the first sidewall reinforcing layer comprises a plurality of cords disposed at substantially a 45° angle with respect to the cords of the carcass ply.

7. The pneumatic tire of claim 1, wherein the radial carcass ply comprises two plies, each having a plurality of cords disposed substantially perpendicularly with respect to the equatorial plane.

8. The pneumatic tire of claim 1, further comprising at least one first annular, circumferential belt, located around a circumference of the radial carcass ply and beneath the tread.

9. The pneumatic tire of claim 8, wherein the annular belt comprises a plurality of parallel steel cords.

10. The pneumatic tire of claim 9, further comprising a second annular belt adjacent to the first annular belt, wherein the second annular belt comprises a plurality of parallel steel cords which cross at an angle with respect to the plurality of steel cords in the first annular belt.

11. The pneumatic tire of claim 10, wherein each annular belt has a plurality of steel cords which are inclined at an angle of about 18° to 30° with respect to the equatorial plane.

12. The pneumatic tire of claim 1, wherein an upper edge of the first sidewall reinforcing layer is positioned below about 60% of the section height of the tire.

13. The pneumatic tire of claim 3, wherein the first sidewall reinforcing layer has a top edge positioned about 3 inches from the contact point of the tire with the design rim.

14. The pneumatic tire of claim 10, further comprising an annular nylon cap disposed over the annular steel belts.

15. The pneumatic tire of claim 1, wherein the first sidewall reinforcing layer has a thickness of between about 0.5 mm and 3 mm.

16. The pneumatic tire of claim 1, further comprising a second sidewall reinforcing layer disposed between the carcass ply and another sidewall, extending from a lower edge positioned within one bead height of a highest extent of the bead.

17. The pneumatic tire of claim 16, wherein the second sidewall reinforcing layer has different design characteristics than the first sidewall reinforcing layer.

18. A vehicle, comprising:
   at least one axle with at least one design rim, on which the tire of claim 1 installed on the at least one design rim, such that the lower edge of the first sidewall reinforcing layer is positioned beneath a contact point of the tire with the design rim.

19. The vehicle of claim 18, wherein the vehicle is one of a light truck, a cargo truck, a military transport vehicle, a subway car, and an airplane.

20. A pneumatic tire, comprising:
   a pair of annular beads having a bead height;
   a radial carcass ply extending between the beads;
   a tread disposed circumferentially around the carcass ply, a center line of the tread defining an equatorial plane of the tire;
   a pair of sidewalls extending from the tread to the beads; and means for reinforcing at least one sidewall of the pair of sidewalls in an area near one bead of the pair of annular beads, the means for reinforcing including one or more adjacent corded layers being disposed between the carcass ply and a first sidewall of the pair of sidewalls, and the one or more adjacent corded layers extending from a lower edge positioned axially outward of the radial carcass within one bead height of a highest extent of one of the plurality of beads and at least one of the one or more adjacent corded layers extending to a top edge of the means for reinforcing located at or above, in a radial direction, a point of maximum section width of the tire.
   wherein the means for reinforciun has a different thickness at the lower edge than at a top edge.

* * * * *